Figure 1:
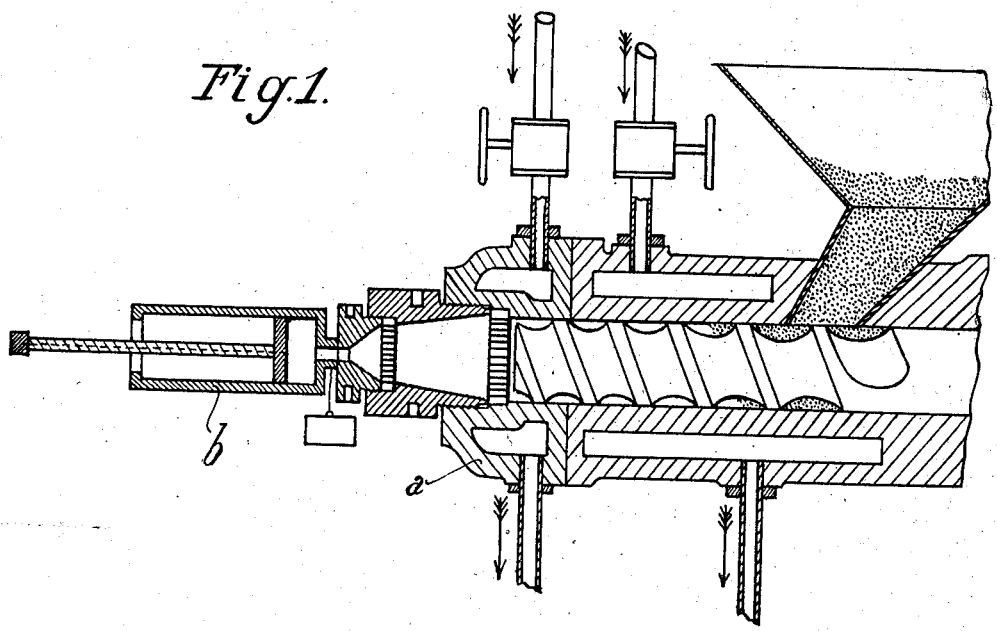

Nov. 3, 1925.  1,560,368
A. BARTELS ET AL
METHOD OF PRODUCING UNITARY FORM PIECES FROM CASEIN ARTIFICIAL HORN
Filed Jan. 12, 1925

Inventors
A. Bartels
O. Miech
By Marks & Clerk
Attys.

Patented Nov. 3, 1925.

1,560,368

UNITED STATES PATENT OFFICE.

AMANDUS BARTELS, OF PFERDEWEG, AND OTTO MIECH, OF HARBURG-ON-THE-ELBE, GERMANY.

METHOD OF PRODUCING UNITARY FORM PIECES FROM CASEIN ARTIFICIAL HORN.

Application filed January 12, 1925. Serial No. 2,012.

*To all whom it may concern:*

Be it known that we, AMANDUS BARTELS and OTTO MIECH, citizens of the German State, residing, respectively, at 20 Eissendorfer, Pferdeweg, and 100 Buxtehuderstrasse, Harburg-on-the-Elbe, Germany, have invented certain new and useful Improvements in a Method of Producing Unitary Form Pieces from Casein Artificial Horn, of which the following is a specification.

It is known that a plastic casein mass, comparatively poor in water, kneaded under high pressure, gives, after hardening and drying, a better artificial horn than a softer casein mass, richer in water. For the new process a ready kneaded, comparatively firm, plastic mass is employed for the manufacture of artificial horn. The object of the invention is to manufacture unitary form-pieces by the use of such casein masses. Hitherto unitary form-pieces have been produced from the ready kneaded, comparatively firm casein mass by bringing the mass into the desired form by means of suitable pressing mechanism, and then hardening and drying it. More particularly casein artificial horn rods are made in this way. Each individual rod is a unitary form-piece. For the production of artificial horn in form-pieces of larger dimensions, pieces of the ready kneaded mass have hitherto been laid together, for instance short rods, or even strips, and united under high pressure, and then hardened and dried. In this way for instance rather large plates of casein artificial horn are ordinarily manufactured. Even blocks of the artificial horn mass can be produced in this way out of which unitary form-pieces can then be made by cutting or pressing partial pieces. In fact blocks have been made from a casein mass in this manner, the blocks cut up into pieces of the desired form, and these worked into artificial horn by hardening and drying.

In the case of this method of making the artificial horn form-pieces, by pressing smaller pieces together, the uniting of the surfaces of the partial pieces in the press-piece often leaves something to be desired. The less kneading occurs in the pressing together of the pieces into the form-piece, the more defective is the union between the surfaces of the individual pieces.

According to the new process, unitary form-pieces are produced from casein artificial horn in a fundamentally different manner. The prepared, comparatively firm casein mass is extruded from a press under yielding pressure into suitable molds fitted to the aperture, and the form-pieces thus obtained, when taken out of the mold, are hardened and then dried. In the case of the new process the result is obtained that the form-pieces retain a completely unitary cohesion. The occurrence of surfaces that have to be united subsequently is obviated. The individual form-piece grows, as it were, out of the place at which the ready kneaded, comparatively firm mass is introduced. The mass is still fluid in the making of the form-pieces, and the form-piece thus obtained is then as it were shaped at one cast.

The mass in the mold employed is subjected to yielding pressure; this can be brought about, for molds for the production of form-pieces of rather large dimensions, by gradually enlarging the mold cavity by means of the pressure under which the mass enters the mold cavity. The mold may be so arranged that a movable bottom subject to counter-pressure can be pressed back by the mass entering the mold cavity.

A piece of apparatus serving for the carrying out of the process is diagrammatically illustrated by way of example in the accompanying drawing.

Figure 1 shows the apparatus in section, and

Figure 2:
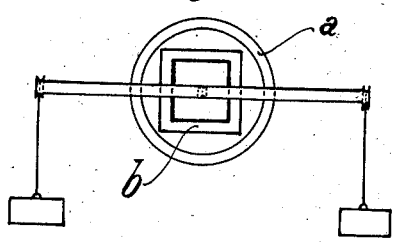

Figure 2 in front elevation.

*a* is a continuously working kneading press of the nature of a screw string press, *b* is the mold with a movable bottom subject to counter-pressure. The kneading press and the movable-bottomed mold are directly connected with one another, so that the ready kneaded mass flows out of the kneading press into the mold.

The advantage of the process is however not merely the complete unitariness of the form-piece of any desired dimensions of artificial horn, but the uniformity of water content preserved in all parts of the form-piece. The possibility of the molded mass warping or becoming distorted during hardening and subsequent drying in consequence of stress differences arising in the piece is obviated or reduced to a minimum.

The mold may also be filled from a plurality of presses. In order to ensure the good cohesion of the mass and the unitariness of the press piece, connecting tubulures are arranged at the outlet apertures of the presses through which the mass is guided into a common mouth piece, from which it is extruded into the mold.

The filling of the mold with a mass coming from different presses is important, for example, when the time of filling has to be shortened, in order to obviate variations in the warmth and plasticity of the mass during the time occupied in the filling of the mold. With this filling of the mold from a plurality of presses may be combined a designing of the mass, masses of different colors being admitted from the individual presses into the common mouth-piece and into the mold. The quantitative relation between masses of different colors for the production of a definite pattern is regulated by the size of the mouth-piece, by differences in the pressure under which the masses are supplied from the individual presses, and by differences in the size and shape of the presses. The designing of the mass may be influenced by arranging an appliance through which the degree of mixing of the differently colored masses with one another is increased, for instance by arranging in the common mouth-piece a wall provided with openings, or by arranging a stationary or movable mandrel or the like therein, or by arranging this or similar devices in front of the outlet aperture of the mouthpiece. The distinctive designs thus obtained cannot be produced in any other way.

In the production of large blocks or other form-pieces, which only harden through uniformly very slowly or not at all, the hardening medium, which only comes into operation gradually, hexamethylene-tetramine for instance, is added to the initial material in the manufacture of the mass.

A special form of the new process consists in converting the prepared casein mass in the manner indicated into the form of a block, cutting this into plates of a suitable thickness, and hardening and drying the plates, so as to make in this way artificial horn plates out of a completely unitary piece. In this manner even comparatively thin plates of artificial horn may be produced which hold together firmly in and mass and which do not warp or can be easily and permanently flattened again. The plates obtained in this way from blocks of different colors may also be employed comparatively well with one another for multicolored laminated plates, which, after hardening and drying, furnish laminated artificial horn plates for working up into ornaments and fancy goods. In order to effect the uniting of the surfaces of the different plates still better, they may be smeared, before being united by means of presses, with suspended calcium hydroxide.

What we claim is:—

1. A process for the manufacture of unitary form-pieces from casein artificial horn, comprising extruding a prepared, comparatively firm casein mass and molding it under yielding pressure, hardening the form pieces thus obtained, and then drying them.

2. A process for the manufacture of unitary form-pieces from casein artificial horn, comprising the separate extrusion of a plurality of prepared, comparatively firm casein masses, the assembling and molding together of the separately extruded masses under yielding pressure, the hardening of the form-pieces thus obtained, and the subsequent drying thereof.

3. A process for the manufacture of unitary form-pieces from casein artificial horn, comprising separately extruding a plurality of prepared, comparatively firm casein masses of different colours, mixing the separately extruded masses together, molding the mixed mass under yielding pressure, hardening the form-pieces thus obtained, and then drying them.

4. A process for the manufacture of plates from casein artificial horn, comprising molding a prepared, comparatively firm casein mass under yielding pressure, then molding the mass into the form of a block, cutting the block into plates, hardening the plates, and then drying them.

In testimony whereof we affix our signatures.

Dr. AMANDUS BARTELS.
OTTO MIECH.